US009311679B2

(12) United States Patent
Shih et al.

(10) Patent No.: US 9,311,679 B2

(45) Date of Patent: Apr. 12, 2016

(54) ENTERPRISE SOCIAL MEDIA MANAGEMENT PLATFORM WITH SINGLE SIGN-ON

(75) Inventors: Clara Shih, San Francisco, CA (US); Robert MacCloy, San Francisco, CA (US); Roger Hu, Los Altos, CA (US); Yahui Jin, San Francisco, CA (US); Steve Garrity, Palo Alto, CA (US)

(73) Assignee: Hearsay Social, Inc., San Francisco, CA (US)

( * ) Notice: Subject to any disclaimer, the term of this patent is extended or adjusted under 35 U.S.C. 154(b) by 225 days.

(21) Appl. No.: 13/285,207

(22) Filed: Oct. 31, 2011

(65) Prior Publication Data

US 2013/0110922 A1 May 2, 2013

(51) Int. Cl.
*G06F 15/16* (2006.01)
*G06Q 50/00* (2012.01)

(52) U.S. Cl.
CPC .................................... *G06Q 50/01* (2013.01)

(58) Field of Classification Search
CPC ........... H04L 63/0209; H04L 63/0815; H04L 63/168; G06Q 50/01; G06Q 30/02; G06Q 30/0241; G06Q 30/0255; G06Q 30/0269; G06F 15/16
USPC ........................................ 709/204; 715/753
See application file for complete search history.

(56) References Cited

U.S. PATENT DOCUMENTS 6,205,453 B1 * 3/2001 Tucker et al. ................. 715/202
6,850,895 B2 * 2/2005 Brodersen et al. ........... 705/7.14
8,370,244 B1 * 2/2013 Daly ...................... G06Q 40/06 705/35
2003/0040995 A1 * 2/2003 Daddario et al. ............... 705/35
2003/0229783 A1 * 12/2003 Hardt ............................ 713/155
2004/0148195 A1 * 7/2004 Kalies ............................... 705/2
2006/0048224 A1 * 3/2006 Duncan et al. .................. 726/22
2006/0080397 A1 * 4/2006 Chene et al. .................. 709/213
2006/0123234 A1 * 6/2006 Schmidt .............. H04L 63/0209 713/168
2006/0174017 A1 * 8/2006 Robertson ..................... 709/229
2008/0242221 A1 * 10/2008 Shapiro et al. ............... 455/3.06
2008/0282324 A1 * 11/2008 Hoal ................................ 726/3
2008/0313714 A1 * 12/2008 Fetterman et al. ................ 726/4

(Continued)

FOREIGN PATENT DOCUMENTS

EP 2224385 9/2010

OTHER PUBLICATIONS

Kruk et al., "D-FOAF: Distributed Identity Management with Access Rights Delegation", 2006.

(Continued)

*Primary Examiner* — Anthony Mejia
*Assistant Examiner* — Mehulkumar Shah
(74) *Attorney, Agent, or Firm* — Van Pelt, Yi & James LLP

(57) ABSTRACT

Managing an enterprise social media management platform includes: receiving a request by a user to perform an action on a social media asset that is maintained at an external social media platform; checking whether the user has permission to perform the action on the social media asset, based at least in part on a mapping of the social media asset and a permission level associated with the user; in the event that the user is determined to have permission to perform the action, allowing the user to proceed with the action on the social media asset; and in the event that the user is determined not to have permission to perform the action, disallowing the user to proceed with the action on the social media asset.

21 Claims, 10 Drawing Sheets

(56) References Cited

U.S. PATENT DOCUMENTS

| | | | | |
|---|---|---|---|---|
| 2009/0100469 | A1* | 4/2009 | Conradt et al. | 725/46 |
| 2009/0132519 | A1* | 5/2009 | Rathod et al. | 707/5 |
| 2009/0171686 | A1* | 7/2009 | Eberstadt | 705/1 |
| 2009/0182664 | A1* | 7/2009 | Trombley | G06Q 10/10 705/42 |
| 2009/0222449 | A1* | 9/2009 | Hom et al. | 707/9 |
| 2010/0077208 | A1* | 3/2010 | Appiah et al. | 713/158 |
| 2010/0114935 | A1 | 5/2010 | Polo-Malouvier et al. | |
| 2011/0022812 | A1* | 1/2011 | van der Linden et al. | 711/163 |
| 2011/0138304 | A1* | 6/2011 | Ungerman | 715/753 |
| 2011/0145064 | A1* | 6/2011 | Anderson | G06Q 30/02 705/14.53 |
| 2011/0178869 | A1* | 7/2011 | Ravichandran et al. | 705/14.49 |
| 2011/0179119 | A1* | 7/2011 | Penn | 709/205 |
| 2011/0246476 | A1 | 10/2011 | Macklem et al. | |
| 2012/0011432 | A1* | 1/2012 | Strutton | 715/234 |
| 2012/0036245 | A1* | 2/2012 | Dare et al. | 709/223 |
| 2013/0014223 | A1* | 1/2013 | Bhatia et al. | 726/4 |
| 2013/0036034 | A1* | 2/2013 | Karon et al. | 705/31 |
| 2013/0074179 | A1* | 3/2013 | Das | H04L 63/0838 726/18 |
| 2013/0086189 | A1* | 4/2013 | Elleouet et al. | 709/206 |

OTHER PUBLICATIONS

Krolo et al., "Security of Web Level User Identity Management", Croatian Society for Information and Communication Technology, Electronics and Microelectronics—MIPRO 2009.

* cited by examiner

| | | | | |
|---|---|---|---|---|
| ESMMP ID | 001 | 001 | 002 | ... |
| TYPE | Insurance Co. | Facebook® | Finance Co. | ... |
| EXTERNAL ID | BobS | 2319982 | AliceJ | ... |
| Token | 764b1c3dd824... | 812e299d18... | 5331b4980e... | ... |

FIG. 4A

| | | | |
|---|---|---|---|
| ASSET ID | 19 | 27 | ... |
| TYPE | Facebook® Page | Twitter Feed | ... |
| EXTERNAL ID | 289476 | @BobSmith | ... |
| NAME | Insurance 101 | Bob's Twitter Feed | ... |

FIG. 4B

| | | | |
|---|---|---|---|
| ASSET ID | 19 | 19 | ... |
| ESMMP ID | 001 | 013 | ... |
| PERMISSIONS | post/delete/view/ view analytics | view/view analytics | |

FIG. 4C

ENTERPRISE SOCIAL MEDIA MANAGEMENT PLATFORM WITH SINGLE SIGN-ON

BACKGROUND OF THE INVENTION

Social networking services have become some of the most popular forms of online services. While currently individuals primarily sign up for social networking services for personal use, efforts are underway to leverage social media such as Facebook®, Twitter®, LinkedIn®, etc. for business use. Companies such as Hearsay Social® are developing products for growing businesses using social media, allowing company employees to use their online social presence and connections to market products, maintain customer relationships, etc. The multitude of social media platforms and their intrinsic nature as forums for individual users present a number of issues for corporate users.

One of the issues associated with harnessing social media for business purposes is the ease of use. Due to the number of individual social media platforms, an employee at a company often has to create and manage multiple accounts, resulting in poor ease of use.

Further, since the online presence is usually directly managed by individual employees (e.g., an insurance sales representative would manage his own Facebook® page), should the employee leave the company, the management would have little control over the accounts and may experience difficulties disassociating the company from the former employee's social media presence.

Another issue arises from the identification of online presence to actual individual persons. On a social media platform, there can be many users having the same/similar name. A company's management would want to have the ability to identify those who are actually affiliated with the company to ensure compliance (e.g., no improper advertising of financial services in violation with federal or state law, etc.). Presently, however, this is difficult to achieve.

Another issue is managing permissions to the accounts. The typical social media sites give "all or nothing" permissions; in other words, a user either has full control to all features such as posting, commenting, deleting, etc., or has no access to the account at all. An additional issue involves managing employees at different corporate branches/regions, which is difficult to do on existing social media platforms.

BRIEF DESCRIPTION OF THE DRAWINGS

Various embodiments of the invention are disclosed in the following detailed description and the accompanying drawings.

FIG. 2 is a flowchart illustrating an embodiment of a setup process for implementing single sign-on.

FIGS. 4A-4C are data structure diagrams illustrating the data structures used by the enterprise social media management platform.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

An enterprise social media management platform supporting single sign-on is described. In some embodiments, a user of the enterprise social media management platform performs a one-time setup to link various social media assets to the enterprise social media management platform. In other words, various "social media identities" of the user that are established on various social media platforms are mapped to the user on the enterprise social media management platform. Credential information is stored so that when the user logs on again, he would gain automatic access to the previously configured social media assets. In some embodiments, the data structure used to support single sign-on is also used to allow individual permissions/privilege settings with respect to the social media assets. In some embodiments, hierarchical information with respect to the user is determined to facilitate monitoring, compliance, and content recommendation.

Figure 1A:
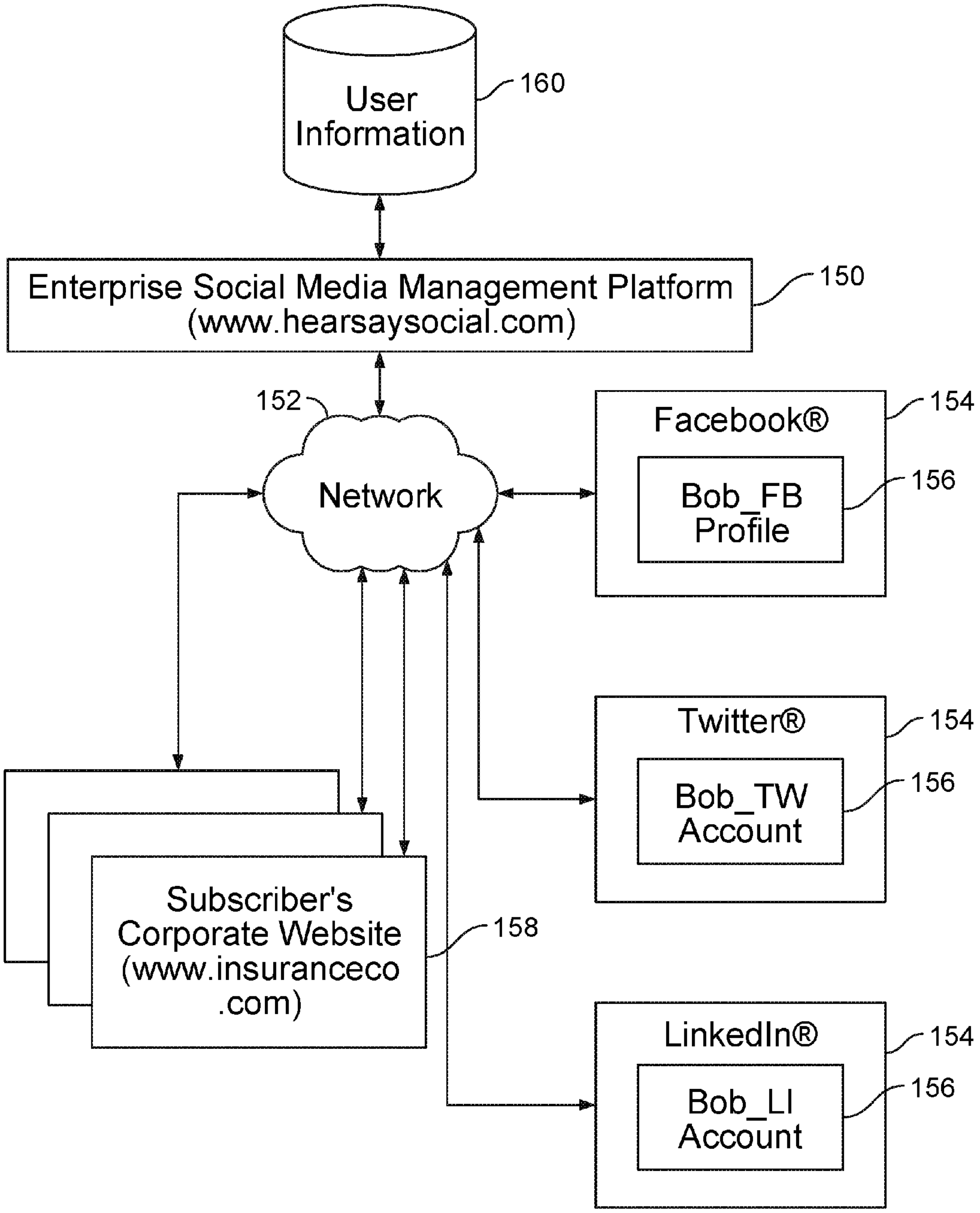
FIG. 1A is a block diagram illustrating an embodiment of an enterprise social media management platform and its associated external systems.

FIG. 1A is a block diagram illustrating an embodiment of an enterprise social media management platform and its associated external systems.

In this example, enterprise social media management platform 150 may be implemented using one or more computing devices such as a computer, a multi-processor system, a microprocessor-based system, a special purpose device, a distributed computing environment including any of the foregoing systems or devices, or other appropriate hardware/software/firmware combination that includes one or more processors, and memory coupled to the processors and configured to provide the processors with instructions. Enterprise social media management platform 150 offers software applications as services. Typically, organizations such as corporations subscribe to the services, and individuals affiliated with the organization are given permission to access the services. As used herein, subscribers refer to organizations subscribing to the services, and users refer to individuals who can access the services.

As will be described in greater detail below, users of the enterprise social media management platform are linked to a variety of social media assets 156 that are made available on various social media platforms 154. As used herein, a social media platform refers to an Internet based service that allows its members to communicate and provides facilities for such communication. Examples of social media platforms include social networking sites such as Facebook®, Twitter®, LinkedIn®, etc. A social media asset refers to content associated with the subscriber and/or its employees/affiliates that is present on various social networking sites or elsewhere. Examples of social media assets include a Facebook® profile of an insurance agent or a page associated with the insurance agent's business, a LinkedIn® profile of the agent, a Twitter® feed by the agent, a Yelp® review of the agent, etc. The social media assets may be created via the social media platforms directly (e.g., by logging on to Facebook® and directly creating a page), using applications provided by the enterprise social media management platform that interacts with the social media platforms via application programming interfaces (APIs) or other appropriate techniques. A social media asset conforms to the requirements of its corresponding social media platform, and is registered with the corresponding social media platform so it is available to others on the same social media platform (i.e., viewable or otherwise accessible by others, in particular by individuals with whom the asset creator has made connections).

The enterprise social media management platform provides a variety of applications for managing social media assets. In some embodiments, the enterprise social media management platform supports web-based applications that may be accessed by its users via a communications network 152 (e.g., the Internet) and offers these applications as services for its subscribers. An example enterprise social media management platform is offered by Hearsay Social, Inc., accessible via http://hearsaysocial.com. The subscribers can be a variety of organizations such as corporations, businesses and the like, and the users of the enterprise social media management platform can be the subscribers' employees or affiliates. For example, the subscribers may include a company ("Insurance Co.") that employs a number of agents, a financial services company ("Finance Co.") that employs a number of financial advisors, etc. In this case, the agents and financial advisors are users of the enterprise social media management platform.

User information is stored in a database 160 maintained by the enterprise social media management platform. As will be described in greater detail below, in some embodiments, the user information includes identification information for the user and login credentials (e.g., security tokens, user name/password combinations, etc.) for accessing social media assets associated with the user. In some embodiments, the user information also optionally includes permissions, corporate hierarchical information of the user, etc. In some embodiments, the enterprise social media management platform authenticates the users using their respective corporate accounts via the subscribers' corporate websites 158. For example, Insurance Co. manages its own website/portal for its own users (e.g., agents). When an agent, who is also an authorized user of the enterprise social media management platform, attempts to log on to the enterprise social media management platform, his logon request is redirected to the corporate website/portal for authentication. If authenticated, the user will be automatically authenticated on the enterprise social media management platform. If the user has not previously configured links to various social media assets, he will also be asked to enter authentication information for accessing social media assets on social media platforms. If the user has previously configured links to various social media assets, the enterprise social media management platform will automatically log him on to the social media platforms using the preconfigured information, so that he may access his social media assets via the enterprise social media management platform without having to enter any additional login information. Such a process, referred to as "single sign-on," allows the user to log on once and gain access to his various accounts at the enterprise social media management platform and at the social media platforms.

Figure 1B:
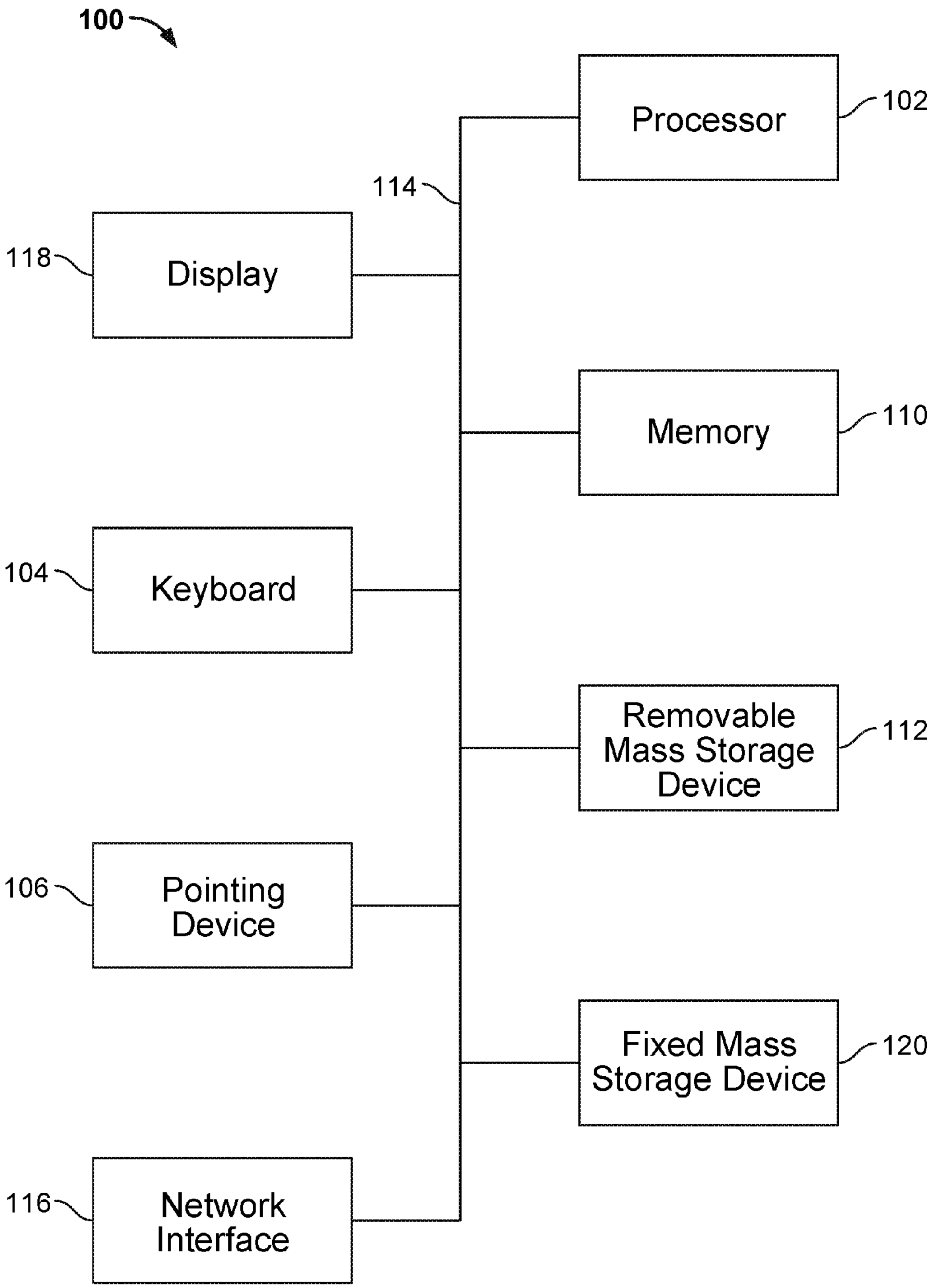
FIG. 1B is a functional diagram illustrating a programmed computer system for providing single sign-on support in accordance with some embodiments.

FIG. 1B is a functional diagram illustrating a programmed computer system for providing single sign-on support in accordance with some embodiments. As will be apparent, other computer system architectures and configurations can be used to perform phenotype predictions. Computer system 100, which includes various subsystems as described below, includes at least one microprocessor subsystem (also referred to as a processor or a central processing unit (CPU)) 102. For example, processor 102 can be implemented by a single-chip processor or by multiple processors. In some embodiments, processor 102 is a general purpose digital processor that controls the operation of the computer system 100. Using instructions retrieved from memory 110, the processor 102 controls the reception and manipulation of input data, and the output and display of data on output devices (e.g., display 118). In some embodiments, processor 102 includes and/or is used to implement the enterprise social media management platform described above, and/or executes/performs the processes described below with respect to FIG. 2.

Processor 102 is coupled bi-directionally with memory 110, which can include a first primary storage, typically a random access memory (RAM), and a second primary storage area, typically a read-only memory (ROM). As is well known in the art, primary storage can be used as a general storage area and as scratch-pad memory, and can also be used to store input data and processed data. Primary storage can also store programming instructions and data, in the form of data objects and text objects, in addition to other data and instructions for processes operating on processor 102. Also as is well known in the art, primary storage typically includes basic operating instructions, program code, data, and objects used by the processor 102 to perform its functions (e.g., programmed instructions). For example, memory 110 can include any suitable computer readable storage media, described below, depending on whether, for example, data access needs to be bi-directional or uni-directional. For example, processor 102 can also directly and very rapidly retrieve and store frequently needed data in a cache memory (not shown).

A removable mass storage device 112 provides additional data storage capacity for the computer system 100, and is coupled either bi-directionally (read/write) or uni-directionally (read only) to processor 102. For example, storage 112 can also include computer readable media such as magnetic tape, flash memory, PC-CARDS, portable mass storage devices, holographic storage devices, and other storage devices. A fixed mass storage device 120 can also, for example, provide additional data storage capacity. The most common example of mass storage 120 is a hard disk drive.

Mass storage 112 and 120 generally store additional programming instructions, data, and the like that typically are not in active use by the processor 102. It will be appreciated that the information retained within mass storage 112 and 120 can be incorporated, if needed, in standard fashion as part of memory 110 (e.g., RAM) as virtual memory.

In addition to providing processor 102 access to storage subsystems, bus 114 can also be used to provide access to other subsystems and devices. As shown, these can include a display monitor 118, a network interface 116, a keyboard 104, and a pointing device 106, as well as an auxiliary input/output device interface, a sound card, speakers, and other subsystems as needed. For example, the pointing device 106 can be a mouse, stylus, track ball, or tablet, and is useful for interacting with a graphical user interface.

The network interface 116 allows processor 102 to be coupled to another computer, computer network, or telecommunications network using a network connection as shown. For example, through the network interface 116, the processor 102 can receive information (e.g., data objects or program instructions) from another network or output information to another network in the course of performing method/process steps. Information, often represented as a sequence of instructions to be executed on a processor, can be received from and outputted to another network. An interface card or similar device and appropriate software implemented by (e.g., executed/performed on) processor 102 can be used to connect the computer system 100 to an external network and transfer data according to standard protocols. For example, various process embodiments disclosed herein can be executed on processor 102, or can be performed across a network such as the Internet, intranet networks, or local area networks, in conjunction with a remote processor that shares a portion of the processing. Additional mass storage devices (not shown) can also be connected to processor 102 through network interface 116.

An auxiliary I/O device interface (not shown) can be used in conjunction with computer system 100. The auxiliary I/O device interface can include general and customized interfaces that allow the processor 102 to send and, more typically, receive data from other devices such as microphones, touch-sensitive displays, transducer card readers, tape readers, voice or handwriting recognizers, biometrics readers, cameras, portable mass storage devices, and other computers.

In addition, various embodiments disclosed herein further relate to computer storage products with a computer readable medium that includes program code for performing various computer-implemented operations. The computer readable medium is any data storage device that can store data which can thereafter be read by a computer system. Examples of computer readable media include, but are not limited to, all the media mentioned above: magnetic media such as hard disks, floppy disks, and magnetic tape; optical media such as CD-ROM disks; magneto-optical media such as optical disks; and specially configured hardware devices such as application-specific integrated circuits (ASICs), programmable logic devices (PLDs), and ROM and RAM devices. Examples of program code include both machine code, as produced, for example, by a compiler, or files containing higher level code (e.g., script) that can be executed using an interpreter.

The computer system shown in FIG. 1B is but an example of a computer system suitable for use with the various embodiments disclosed herein. Other computer systems suitable for such use can include additional or fewer subsystems. In addition, bus 114 is illustrative of any interconnection scheme serving to link the subsystems. Other computer architectures having different configurations of subsystems can also be utilized.

Figure 2:
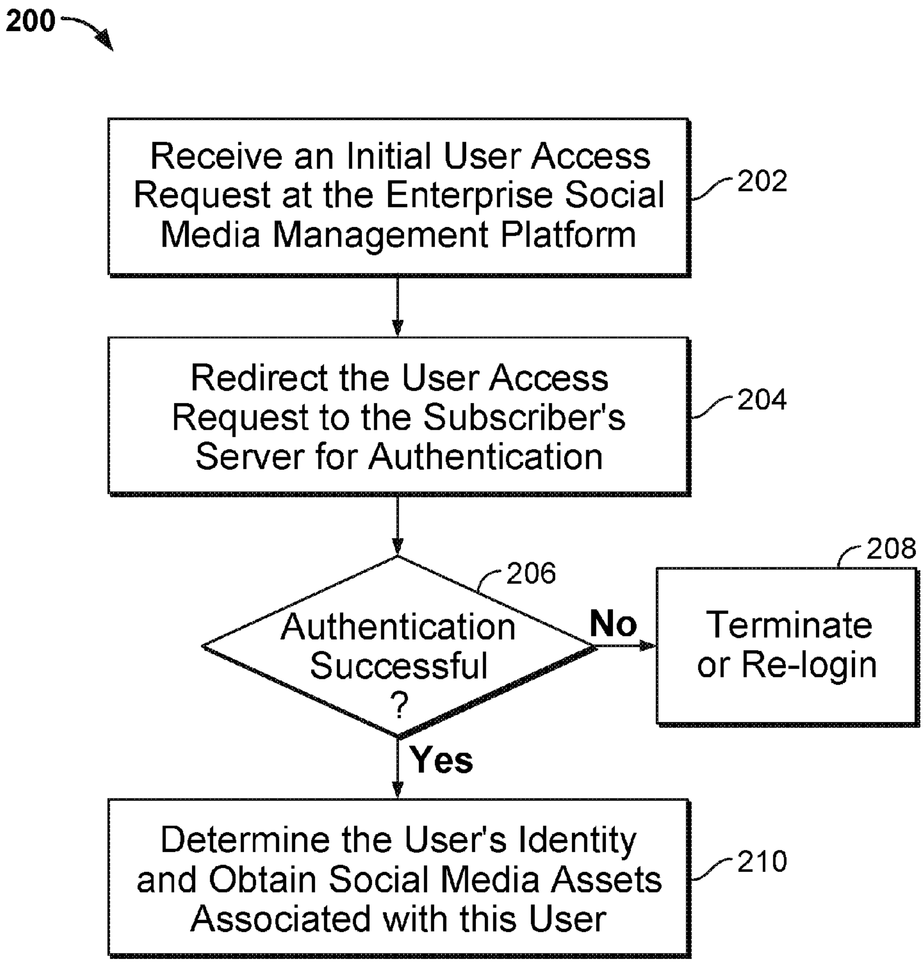

FIG. 2 is a flowchart illustrating an embodiment of a setup process for implementing single sign-on. Process 200 can be performed by a system such as 100.

At 202, an initial user access request is received at the enterprise social media management platform. In this example, the user access request (e.g., logon request) is sent by software running on the user's device (e.g., a browser or other client software) and is encoded as a Universal Resource Locator (URL) request that includes identification information about the particular subscriber organization with which he/she is affiliated (also referred to as the employer organization). In some embodiments, the request includes a subscriber identifier in the domain name or the path. For example, the request from an insurance agent at Insurance Co. may be directed to the URL of "insuranceco.hearsaysocial.com" or "hearsaysocial.com/insuranceco," and the request from a financial advisor at Finance Co. may be directed to the URL of "financeco.hearsaysocial.com" or "hearsaysocial.com/financeco." Any other appropriate ways for including identification information of the organization may also be used; for example, the identification information may also be encoded as a string or a parameter in the user request.

At 204, the server at the enterprise social media management platform redirects the user access request to the subscriber's server for authentication. In this example, the enterprise social media management platform and the subscriber's server cooperate to authenticate the user. In some embodiments, the enterprise social media management platform server parses the user request to determine the subscriber's identity. For example, if the request includes the identifier "insuranceco," then the request is by a user affiliated with Insurance Co. and should be redirected to Insurance Co.'s web server. The enterprise social media management platform looks up a previously configured address that is located at the subscriber site for redirecting the request (e.g., "www.insuranceco.com/login") and sends the redirected request.

Upon receiving the redirected request, the subscriber's server (e.g., corporate website server 158 of FIG. 1A) provides a user interface for the user to enter his user name and password, which is sent to the user's browser and rendered. In some embodiments, the interface is the same as or similar to the interface for the user to directly log on to his corporate account. Authentication is then performed by the subscriber's server based on the corporate account information entered by the user. If the authentication is successful, the subscriber's server sends a success indication to the enterprise social media management platform; if not successful, a failure indicator is sent. In some embodiments, the communication between the enterprise social media management platform and the subscriber's server is based on security protocols such as Security Assertion Markup Language (SAML) or OAuth.

In some embodiments, users with accounts on the subscriber's server have different levels of access to the enterprise social media management platform. For example, some organizations may permit only a subset of its users to access the enterprise social media management platform. Access may be controlled by the subscriber's server or on the enterprise social media management platform. For example, some subscriber systems use Active Directory to configure different access rules for different groups of users. When the redirected user request is received from the enterprise social media management platform, the server looks up the user's permission level in the Active Directory configuration and only allows authentication to proceed if the user has permission to access the enterprise social media management platform's services. In some embodiments, a list of permitted users is stored on the enterprise social media management platform and compared with the authentication result returned by the subscriber's server. Only permitted users who are successfully authenticated are allowed to proceed.

At 206, it is determined whether the authentication is successful. In this example, the indicator returned by the subscriber's server is examined to determine whether the user has logged on to the subscriber's site (and therefore the enterprise social media management platform) successfully. If the authentication is unsuccessful, the process terminates or the user is given another opportunity to re-login at 208. If the logon is successful, the process proceeds to 210.

During the setup process, at 210, the enterprise social media management platform determines the user's identity and obtains social media assets associated with this user. For example, when Bob Smith, an insurance agent from Insurance Co. logs on to the enterprise social media management platform, the platform will attempt to link various social media assets (e.g., profiles or accounts) that may be associated with Bob at various social media platforms. The platform may establish the links via automatic discovery (e.g., identifying profiles/pages/accounts/etc. associated with the name Bob Smith) and/or user input (e.g., Bob enters profiles or accounts he has created). User interfaces for establishing links between the user's identity and various social media assets are displayed to the user. The user may establish links between his identity and social media assets he deems to be pertinent to the organization and omit irrelevant ones. For example, Bob may choose to establish a link between a profile of his insurance business and his account on the enterprise social media management platform, but omit a page dedicated to his personal hobbies. The established link information is stored at the enterprise social media management platform (e.g., in a database such as 160).

Figure 3A:
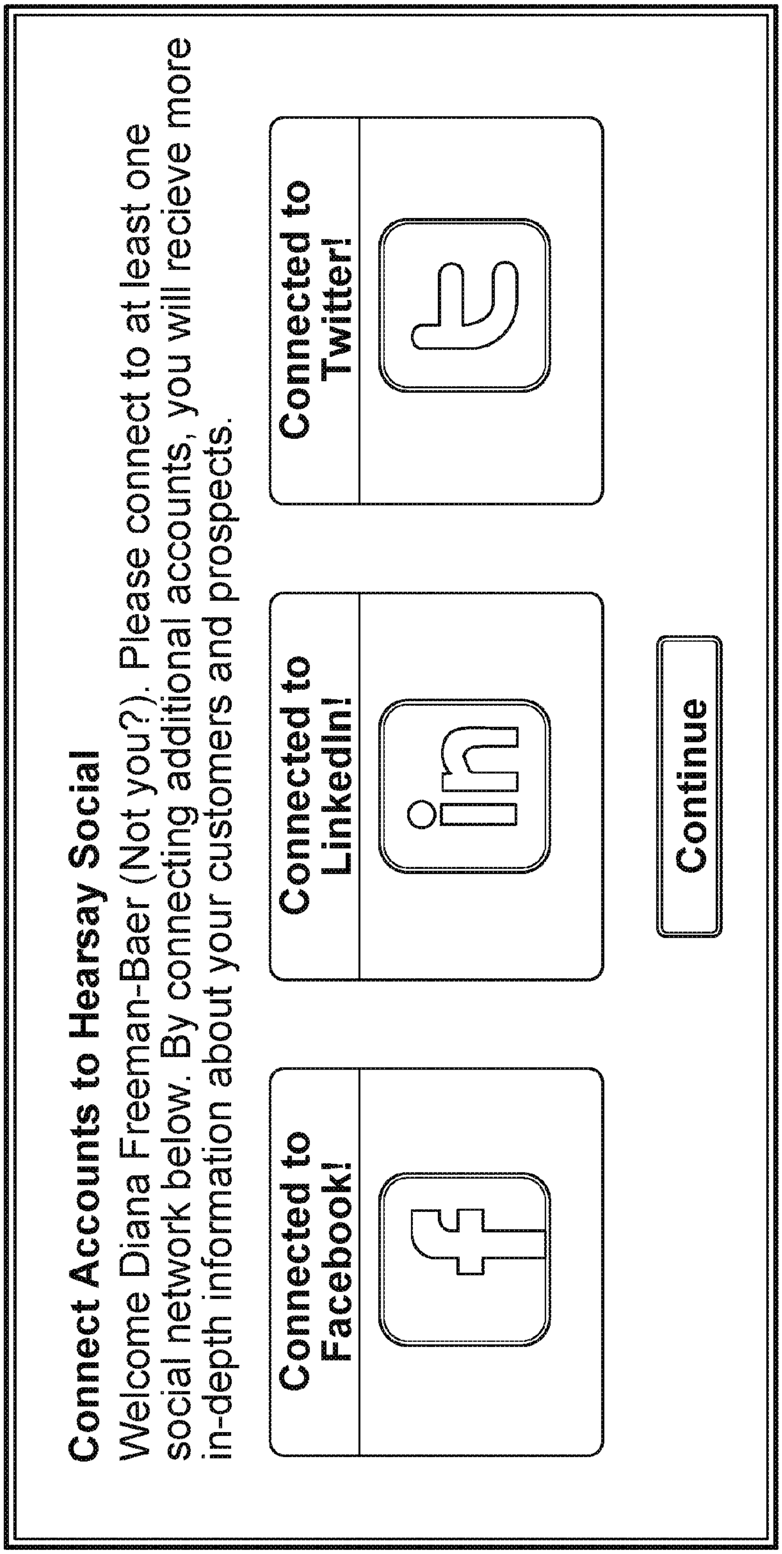
FIGS. 3A-3E are user interface diagrams illustrating embodiments of user interfaces for establishing links between the user's identity and social media assets.
Figure 3B:
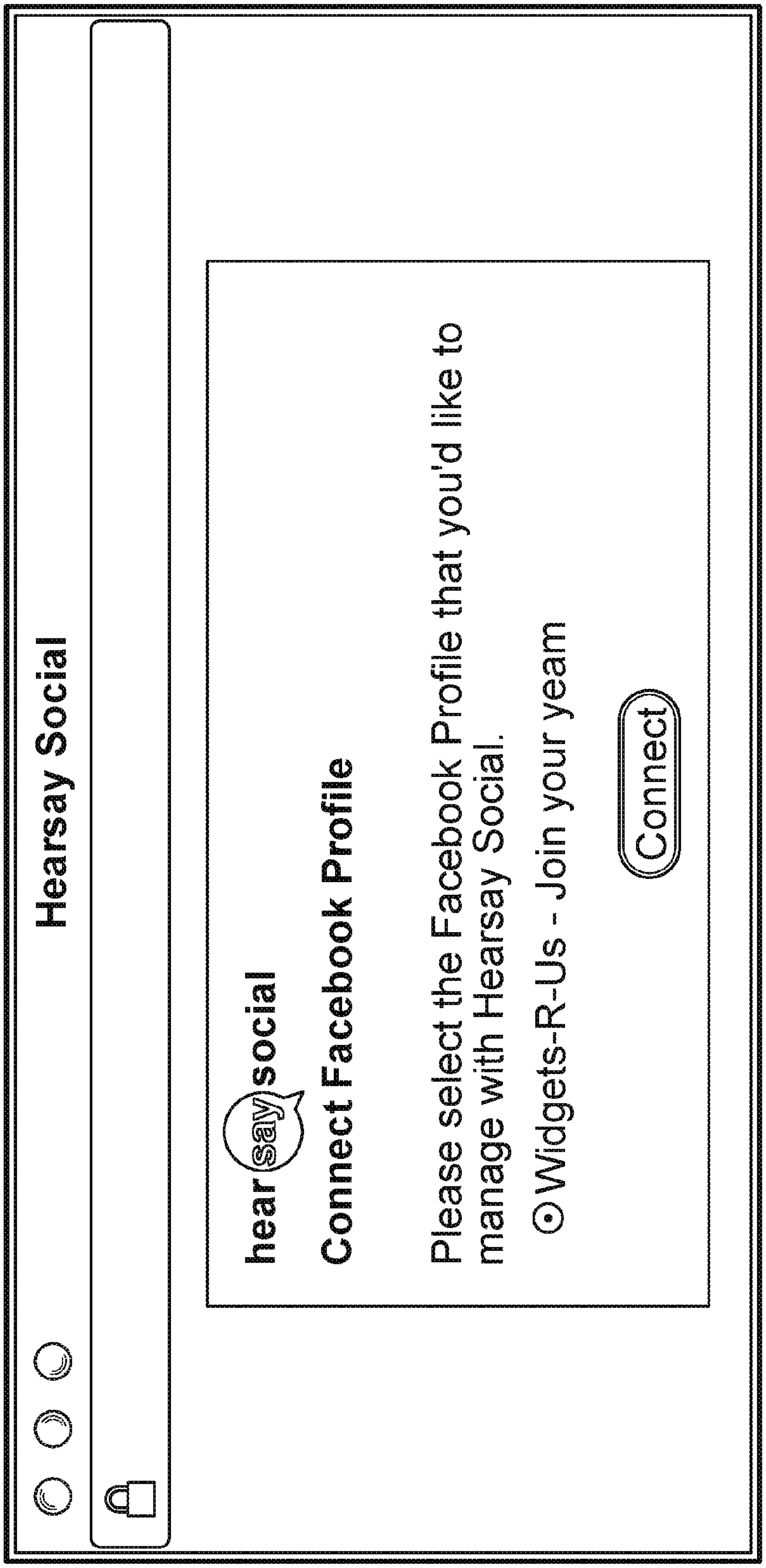

FIGS. 3A-3E are user interface diagrams illustrating embodiments of user interfaces for establishing links between the user's identity and social media assets. Once the user initially logs on to the enterprise social media management platform (via the subscriber's server), user interface widgets are presented for the user to configure the user's social media assets on various social media platforms. In this example, as shown in FIG. 3A, buttons are displayed to allow the user to connect to Facebook®, LinkedIn®, or Twitter®, although other social media platforms can be made available in other embodiments.

Figure 3C:
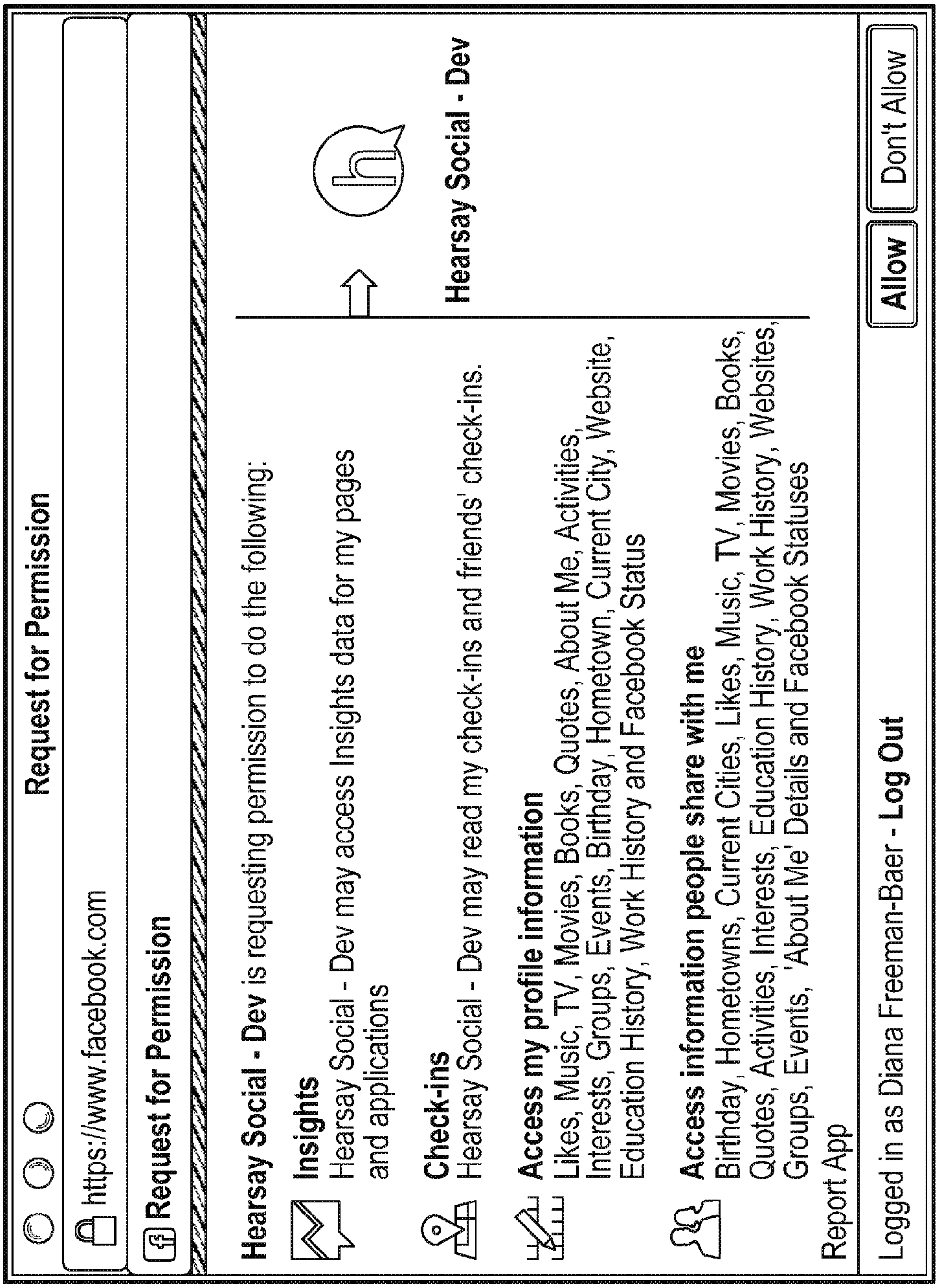

In this example, the user first selects to connect to Facebook®. The enterprise social media management platform redirects the user to Facebook, where they log in to Facebook and grant permissions to the enterprise social management platform. The user interface of FIG. 3B displays the matching profiles to the user, who can use the interface to select one or more appropriate profiles and provide additional permissions in connection with the selected profile(s). In the example shown, a profile for "Widgets-R-Us" is found to match this user. Thus, as shown in FIG. 3C, Facebook® indicates to the user that there is a request for permission from the third party (in this case, Hearsay Social®), and provides the user an additional opportunity to allow or deny access.

Figure 3D:
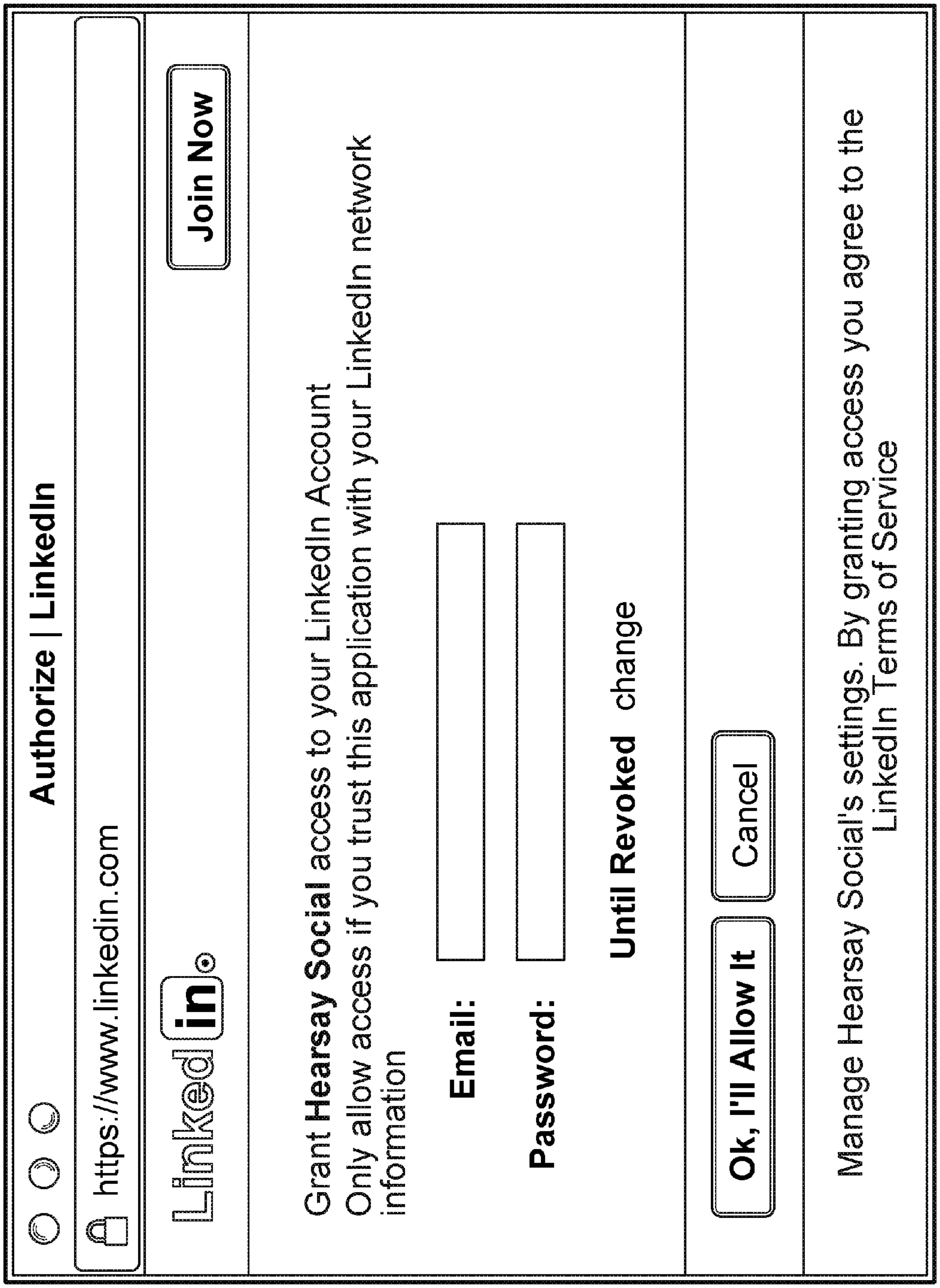
Figure 3E:
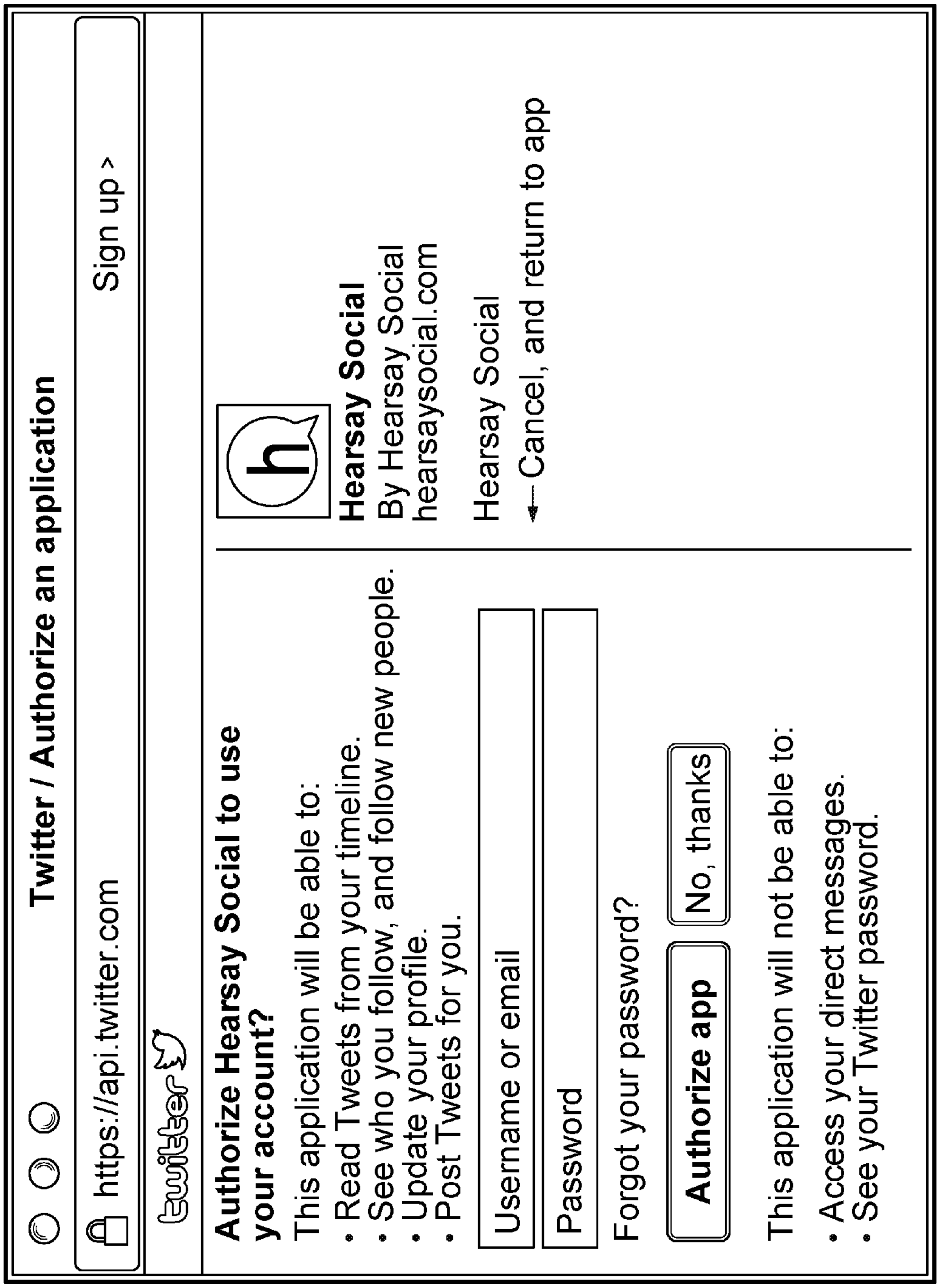

Other social media platforms also provide similar interfaces for access. For example, FIG. 3D shows the authorization interface provided by LinkedIn® upon receiving a request from the enterprise social media management platform to access a LinkedIn® account, and FIG. 3E shows the authorization interface provided by Twitter®. In both cases, the user is asked to enter username and password information to authorize the enterprise social media management platform to access the user's logon information.

Once successfully authenticated, the social networking sites provide authentication information such as token information via their respective APIs. The authentication information is saved by the enterprise social media management platform to be used for future access. Once the user's access to the enterprise social media management platform and various social media platforms is set up, he can sign on once to the subscriber's server or the enterprise social media management platform, and access multiple social media platforms and social media assets on these platforms.

In addition, the support built into the enterprise social media management platform for the single sign-on feature is also used to allow the platform to automatically control permission levels for the social media assets by different users. In some embodiments, the permission levels are configured at the subscriber's server using a directory service (e.g., Active Directory® by Microsoft®). For example, the insurance company management may determine that all insurance sales representatives have posting, viewing (both of the page itself and analytics pertaining to the page) and deletion privileges to a Facebook® page pertaining to the company, but the representatives' assistants only have viewing privileges of the page itself and page analytics. Thus, at the subscriber's server, within Active Directory service, permission rules specifying these permission levels are configured by a system administrator. In some embodiments, the rules are propagated to the enterprise social media management platform, and the permission levels of a social media asset for particular users are stored. In some embodiments, Active Directory service is queried when the enterprise social media management platform needs to determine the permission level associated with a user.

FIGS. 4A-4C are data structure diagrams illustrating the data structures used by the enterprise social media management platform. Although tables are used as data structures for storing user account and social media asset information in the examples below, any other appropriate arrangements, organizations, structures, etc. can be used in other embodiments.

An example of social identity to user identity mapping is illustrated in FIG. 4A. Specifically, a table is used to store identity information for the users' external accounts and respective authentication information for these external accounts. Each column represents a specific external account for a specific user. The first row, ESMMP ID represents the user's internal identifier on the enterprise social media management platform. An alphanumeric identifier is used in this example, but other appropriate types of identifiers can be used. The second row, TYPE, represents the particular organization or social media platform to which the account belongs. Examples include "Insurance Co.," "Finance Co.," "Facebook®," "Twitter®," etc. The third row, EXTERNAL ID, represents the user name assigned by the organization or social media platform that is associated with the user's account.

The last row, "Token," stores the security token (e.g., OAuth token) used by the subscriber's server or the social media platform to authenticate the user's account. The tokens are obtained at setup time when the user logs on to the subscriber site or the social media website using application programming interfaces (APIs) for obtaining security tokens. In some embodiments, 202-208 of process 200 are substantially the same for the setup process and for the user logon process. Once the user logs on successfully, when permitted actions are conducted by the user with respect to various social media assets on social media platforms, the token information may be sent to the social media platforms to indicate that the user is authorized and has permission to perform these actions.

In FIG. 4B, a table is used to store social media asset information. In this example, each column corresponds to a particular social media asset. The first row, ASSET ID, is the identifier assigned to the social media asset by the enterprise social media management platform. The next row, TYPE, represents the particular social media platform to which the asset belongs. The next row, EXTERNAL ID, represents the identifier of the social media asset used by its corresponding social media platform. The last row, NAME, represents the human readable name of the social media asset.

In FIG. 4C, a table is used to store the mapping relationships between a social media asset and the user identifier. Each column represents a particular mapping relationship. The first row, ASSET ID, is the identifier assigned to the social media asset by the enterprise social media management platform. The next row, ESMMP ID, is the identifier of the user on the enterprise social media management platform who has access to the asset. The next row, PERMISSIONS, indicates the actions the user is permitted to perform on the social media asset. In the example shown, the social media asset with an identifier of 19 (a Facebook® page with the name of "Insurance 101") is accessible by users with the ESMPP IDs of 001 and 013. User 001 (Bob Smith) is permitted to post, delete, and view this asset. In contrast, User 0013 is allowed to view the asset only.

Figure 5:
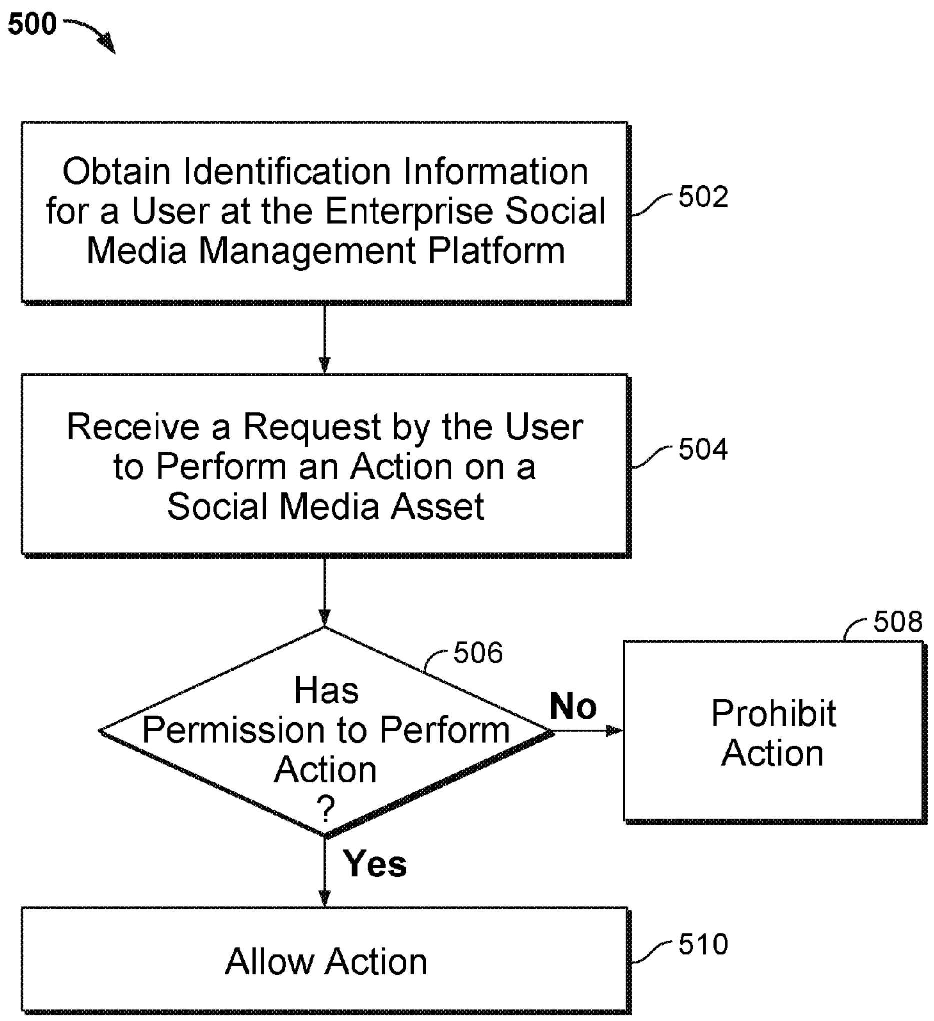
FIG. 5 is a flowchart illustrating an embodiment of a process for permissions checking.

FIG. 5 is a flowchart illustrating an embodiment of a process for permissions checking. It is assumed that user and asset information has already been setup and the user has logged on to the enterprise social media management platform via the subscriber's server. Process 500 may be performed on an enterprise social media management platform.

At 502, the identification information for a user at the enterprise social media management platform is obtained. The information may be obtained, for example, when the user successfully logs on and the subscriber's server returns user identifier information.

At 504, a request by the user to perform an action on a social media asset is received. In some embodiments, the request is sent by the user via a user interface provided by the enterprise social media management platform's applications. For example, the user may indicate that he wishes to post to a particular Facebook® page (e.g., "Insurance 101").

At 506, it is determined whether the user has permission to perform the action on the social media asset. In some embodiments, to make the determination, the identifier of the social media asset is obtained based on the request, and the stored social media asset and user permission level mapping is looked up for the social media asset.

In some embodiments, a table such as the one shown in FIG. 4C may be looked up to determine the permission levels. For example, if the user attempting to post to "Insurance 101" page is Bob's assistant Charlie (who has an ESMMP ID of 013), the corresponding table entry would indicate that he has viewing privileges only, and the enterprise social media management platform would therefore prevent Charlie from completing the action at 508. Optionally, a warning may be issued and the unsuccessful attempt may be logged.

Next, Bob Smith (who has an ESMMP ID of 001) is attempting to post to the same page. In the example shown, the corresponding table entry would indicate that Bob has posting privileges and therefore is allowed to proceed at 510. The enterprise social media management platform cooperates with the social media platform, using APIs provided by the social media platform to complete the action. For example, the application executing on the enterprise social media management platform may invoke a function implementing a Facebook Connect® API for sending a message requesting information to be posted to the Facebook® page "Insurance 101." Security token information may be obtained from, for example, the table in FIG. 4A and sent to the social media platform to indicate that the user is authorized.

In some embodiments, the enterprise social media management platform proxies the user's request with the social media platforms to allow for more granular access control than default access control provided by the social media platforms. For example, on many existing social media platforms, users either have no privilege at all with respect to an asset or have full privileges to edit, delete, view, etc. To enable finer grained access, the enterprise social media management platform proxies the user's request by examining the user's privilege level, only permitting allowed requests to proceed, and modifying the request such that the modified request appears to be originated from a user with access privileges. For example, assistant Charlie sends a request to view analytics of a private Facebook® page set up by Bob. The enterprise social media management platform receives the request, determines that Charlie has viewing privileges, and sends a modified request to Facebook® that appears to be originated from Bob's account. This way, Charlie can view the analytics information even if Bob has not granted him the privilege to do so via Facebook®. Requests exceeding the requester's privilege level (for example, if Charlie makes a request to delete the page to which he has no delete privileges) are detected and prohibited.

The configurable permissions allow the corporations to have greater control over the privilege levels of their users. For example, by configuring Active Directory settings, a corporate administrator can set/unset different user access privilege levels to various social media assets, enabling new employees to have instant access and disabling former employee's access without having to log on to each social media platform and individually reconfigure access levels.

In some embodiments, the enterprise social media management platform uses the existing infrastructure for single sign-on to monitor social networking activities. The corporation may set up certain policies such as the types of advertising activities that are permitted on social networking sites, prohibited keywords in postings, etc. In some embodiments, the enterprise social media management platform is configured to monitor activities on social media assets linked to the corporation's users. Techniques such as rule matching and keyword filtering may be applied to detect violations. If activities in violation of the policies are detected, the owner of the social media assets in question or other appropriate personnel at the corporation may be notified, so that actions may be taken to ensure compliance. In some embodiments, the enterprise social media management platform is configured to independently monitor various social media assets. If any inappropriate activity is detected, the identifier associated with the social media asset is looked up in the user information database on the enterprise social media management platform to determine whether the activity is associated with a user of the platform. For example, the monitoring process may detect that a user with Facebook® identifier of 2319982 has made an inappropriate comment on someone's wall. Based on, for example, the table shown in FIG. 4A, it is determined that the Facebook® user corresponds to Bob Smith, who has an ESMMP ID of 001. The user or his supervisor may be notified so actions can be taken.

In some embodiments, the support built into the enterprise social media management platform for the single sign-on feature is additionally used to allow the platform to determine the user's role within the corporation's hierarchy, and suggest certain content based on the hierarchical information. In some embodiments, the corporate server maintains hierarchical information for its users using techniques such as Active Directory. During the setup process, the corporate web server returns to the enterprise social media management platform additional information regarding the user's position within the corporate hierarchy. For example, Insurance Co. organizes its corporate hierarchy according to geographical locations, where each agent is assigned a state, a district, and an agent identifier. Upon successful user authentication, Insurance Co.'s webserver returns hierarchical information regarding the user's state and district, agent identifier, etc. The information is encoded according to a predefined format. The enterprise social media management platform is configured to parse the encoded information and stores the hierarchical information in the user database (using its own format if appropriate). The hierarchical information can be used to suggest content to the user.

For example, when Bob Smith initially logs on to Hearsay Social's website via redirection to Insurance Co's web server, the latter web server sends hierarchical information indicating that Bob is in the state of California, district 7. Based on the hierarchical information, the enterprise social media management platform can provide appropriate content to the user. For example, the corporation may wish to deliver certain content that is appropriate only for district 7 in California (e.g., an advertising campaign that says "Happy Labor Day, Be Safe on Lake Tahoe"). The platform can be used to identify targeted users such as Bob based on their hierarchical information and send the content only to these users.

In some embodiments, the social media assets are also assigned hierarchical positions. For example, social media assets linked to Bob, such as the "Insurance 101" page and Bob's twitter feed, can be assigned hierarchical information by Bob via a configuration interface. In some embodiments, the system automatically associates the social media assets linked to Bob to have the same hierarchical position as Bob (in this case, California, district 7). Later, when another user, Dan (who is also in California, district 7) logs on, the platform can recommend social media assets within the same hierarchical position (such as the "Insurance 101" page and Bob's twitter feed) to Dan, as well as recommend social media assets linked to Dan to other users within the same hierarchical position (e.g., Bob).

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:

receiving, at an enterprise social media management platform, a request by a user to perform an action on a social media asset that is maintained at an external social media platform, wherein the social media asset is associated with the user's account on the enterprise social media management platform;

redirecting to an external corporate server the request that is received at the enterprise social media management platform to perform the action on the social media asset that is maintained at the external social media platform, the enterprise social media management platform being separate from the external social media platform, and the external corporate server being separate from the external social media platform;

authenticating the user based on an external corporate account of the user on the external corporate server to which the request is redirected;

in the event that the authentication is successful:

determining, using a computer processor of the enterprise social media management platform, whether the user has permission to perform the action on the social media asset maintained at the external social media platform, based at least in part on a mapping of the social media asset and a permission level associated with the user;

in the event that the user is determined to have permission to perform the action on the social media asset maintained at the external social media platform:

proxying by the enterprise social media management platform the request by the user with the external social media platform by modifying the request to appear as a request originating from a different user, wherein the different user is associated with the social media asset and with a previously stored credential that is a credential used to access the social media asset, the previously stored credential being stored on the enterprise social media management platform that redirected to the external corporate server the request to perform the action on the social media asset, automatically sending by the enterprise social media management platform the previously stored credential associated with the different user to the external social media platform to authenticate the user on the external social media platform, and allowing the user to proceed with the action that does not exceed the permission level of the user on the social media asset; and in the event that the user is determined not to have permission to perform the action, disallowing the user to proceed with the action on the social media asset.

2. The method of claim 1, wherein the user's account is linked to a plurality of social media assets on a plurality of external social media platforms.

3. The method of claim 1, wherein the user is logged into the enterprise social media management platform using the external corporate account of the user on the external corporate server, the external corporate account being different from the social media account.

4. The method of claim 1, wherein whether the user has permission to perform the action on the social media asset maintained at the external social media platform is configured on the external corporate server.

5. The method of claim 1, wherein whether the user has permission to perform the action on the social media asset is configured using Active Directory on the external corporate server.

6. The method of claim 1, further comprising:

monitoring activities on the external social media platform;

identifying an inappropriate activity by a user of the external social media platform; and determining a user identity on the enterprise social media management platform that corresponds to the identified user of the external social media platform.

7. The method of claim 1, further comprising sending an access request to the social media asset platform, the access request comprising a credential of the user on the external social media platform.

8. The method of claim 1, further comprising determining a corporate hierarchical position associated with the user.

9. The method of claim 8, further comprising recommending to the user content that corresponds to the corporate hierarchical position.

10. The method of claim 8, further comprising assigning the social media asset to the corporate hierarchical position.

11. A system, comprising:

a processor configured to:

receive, at an enterprise social media management platform, a request by a user to perform an action on a social media asset that is maintained at an external social media platform, wherein the social media asset is associated with the user's account on the enterprise social media management platform;

redirect to an external corporate server the request that is received at the enterprise social media management platform to perform the action on the social media asset that is maintained at the external social media platform, the enterprise social media management platform being separate from the external social media platform, and the external corporate server being separate from the external social media platform;

authenticate the user based on an external corporate account of the user on the external corporate server to which the request is redirected;

in the event that the authentication is successful:

determine whether the user has permission to perform the action on the social media asset maintained at the external social media platform, based at least in part on a mapping of the social media asset and a permission level associated with the user;

in the event that the user is determined to have permission to perform the action on the social media asset maintained at the external social media platform:

proxy the request by the user with the external social media platform by modifying the request to appear as a request originating from a different user, wherein the different user is associated with the social media asset and with a previously stored credential that is a credential used to access the social media asset, the previously stored credential being stored on the enterprise social media management platform that redirected to the external corporate server the request to perform the action on the social media asset, automatically send the previously stored credential associated with the different user to the external social media platform to authenticate the user on the external social media platform, and allow the user to proceed with the action that does not exceed the permission level of the user on the social media asset; and in the event that the user is determined not to have permission to perform the action, disallow the user to proceed with the action on the social media asset; and a memory coupled to the processor and configured to provide the processor with instructions.

12. The system of claim 11, wherein the user's account is linked to a plurality of social media assets on a plurality of external social media platforms.

13. The system of claim 11, wherein the user is logged into the enterprise social media management platform using the external corporate account of the user on the external corporate server, the external corporate account being different from the social media account.

14. The system of claim 11, wherein whether the user has permission to perform the action on the social media asset maintained at the external social media platform is configured on the external corporate server.

15. The system of claim 11, wherein whether the user has permission to perform the action on the social media asset is configured using Active Directory on the external corporate server.

16. The system of claim 11, wherein the processor is further configured to send an access request to the social media asset platform, the access request comprising a credential of the user on the external social media platform.

17. A method for managing an enterprise social media management platform, comprising:

determining, at the enterprise social media management platform, a corporate hierarchical position of a first user within a corporate hierarchy, wherein the first user has a similar position in the corporate hierarchy as a second user, the corporate hierarchical positions of the first and second users within the corporate hierarchy being maintained at a corporate server that is external to the enterprise social media management platform;

recommending social media content to the second user according to the determined corporate hierarchical position of the first user within the corporate hierarchy, including:

determining, at the enterprise social media platform, based at least in part on the corporate hierarchical position of the first user that is maintained at the corporate server that is external to the enterprise social media management platform, among available social media content that is generated on one or more social media sites and that is configured to be appropriate for respective sets of users according to their organizational hierarchy, the social media content that is configured to be appropriate for users having the corporate hierarchical position of the first user; and assigning hierarchical positions to the available social media content;

sending the social media content that matches the determined corporate hierarchical position of the first user to the second user for the second user to take action with respect to the social media content on the one or more social media sites.

18. The method of claim 17, wherein determining the social media content that is configured to be appropriate for users having the corporate hierarchical position includes matching an assigned hierarchical position of a piece of available social media content with the corporate hierarchical position of the first user.

19. The method of claim 1, further comprising:

determining, at the enterprise social media management platform, a corporate hierarchical position of a user within a corporate hierarchy;

recommending social media content to the user according to the corporate hierarchical position of the user within the corporate hierarchy, including:

determining based at least in part on the corporate hierarchical position of the user, among available social media content that is generated on one or more social media sites and that is configured to be appropriate for respective sets of users according to their organizational hierarchy, the social media content that is configured to be appropriate for users having the corporate hierarchical position; and sending the social media content that is determined based at least in part on the corporate hierarchical position of the user to the user.

20. The method of claim 1, wherein the request is encoded as a Universal Resource Locator (URL) request that includes identification information about the user's employer organization.

21. The system of claim 11, wherein the request is encoded as a Universal Resource Locator (URL) request that includes identification information about the user's employer organization.

* * * * *